May 7, 1968

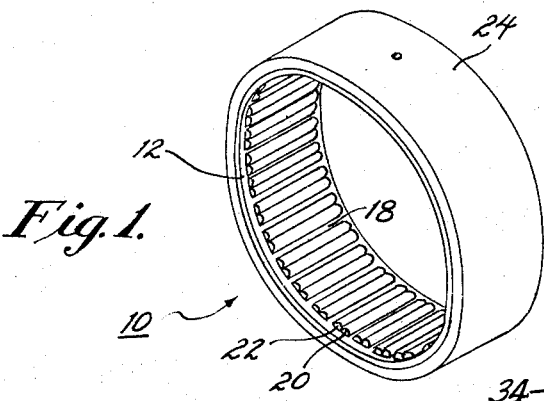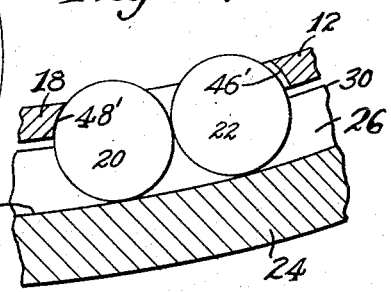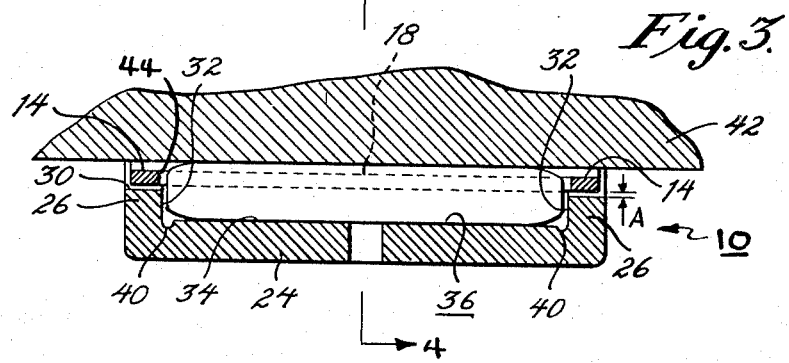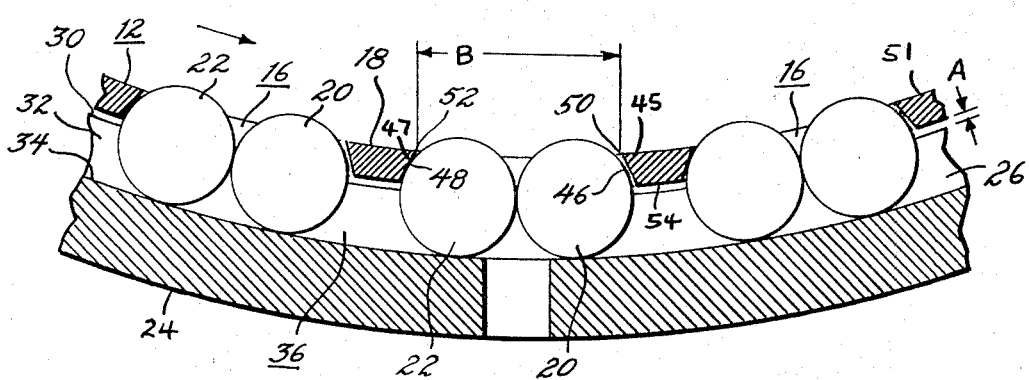

H. SCHMIDT 3,382,016

ARRANGEMENT OF TANDEM ROLLERS IN A ROLLER
BEARING AND METHOD OF ASSEMBLING SAME

Filed Nov. 1, 1965

INVENTOR
HEINRICH SCHMIDT
BY Denny and Denny
HIS ATTORNEYS.

United States Patent Office 3,382,016
Patented May 7, 1968

3,382,016
ARRANGEMENT OF TANDEM ROLLERS IN A ROLLER BEARING AND METHOD OF ASSEMBLING SAME
Heinrich Schmidt, Levittown, Pa., assignor to Roller Bearing Company of America, Trenton, N.J., a corporation of New Jersey
Filed Nov. 1, 1965, Ser. No. 505,810
12 Claims. (Cl. 308—207)

ABSTRACT OF THE DISCLOSURE

The present invention relates to a tandem roller bearing of cage type in which the cage has windows for retention of a group of rollers, preferably two, there being crossbars separating the windows and rims connecting the crossbars at the ends, the crossbars having interference to retain the rollers in the windows, and the last roller as it is inserted into the window exerting a force on a roller already in the window to urge its adjoining crossbar and both rims away from the raceway and flanges at the end thereof so as to provide space to permit the last roller to snap into and be retained in the window.

Description of invention

This invention relates to a cage type roller bearing of the type in which the cage, during operation, rides on flanges forming part of a race. That is, this invention is directed to using multiple rollers in a window of a cage of the type, disclosed in Herrmann et al., Pat No. 2,884,288, wherein the cage rides on flanges provided by the race rather than riding on the rollers i.e., the race flanges provide the sole support for the cage and the clearance between the cage and flanges is small so that there is no substantial radial movement of the cage relative to the race ring.

As is known, for a given roller bearing, the capacity of the bearing may be increased by increasing the number of rollers. However, the crossbars must be wide enough to provide sufficient rigidity to the cage so that the cage may perform its guiding function which limits the extent to which the width of the crossbars may be reduced. One solution to keeping crossbars of adequate width is to provide windows each of which receive two rollers, resulting in a bearing with a larger number of rollers and less crossbars. Also, when assembled with an outer or inner race, the cage should retain the rollers so that the rollers, cage and outer or inner race may be shipped from the factory as one assembled unit.

Various proposals have been made heretofore to retain the group of two rollers in a single window of a cage. Some of the proposals suggest the use of projections extending from the crossbars in connection with web projections extending from the cage rims toward the center of the window. It has also been suggested that suitable projections may be formed by deformation of the cage material (such as by staking) or injection molding and subsequent deformation of the cage material, or by sleeves placed about the cage. But staking alters the original structure of the material and the projections produced by staking, may tend to flake off during operation; the molding process requires complicated and expensive molding dies; and the use of sleeves is not economical.

Thus, it is an objective of this invention to retain multiple rollers in a window of a thin cage which rides on flanges formed integral with the race without the use of staked projections, molding of the cage, or sleeves about the cage, and to provide an economical and practical method of assembling such rollers to the cage and the race.

In a bearing incorporating this invention, the race has integral flanges defining a raceway therebetween with a generally cylindrical surface of the race. Riding upon the race flanges are the rims of a cage which, with the crossbars extending between the cage rims, define windows or pockets for the rollers. The cage is of thin cross-section relative to the diameter of a roller, i.e., its thickness is less than one-third the diameter of a roller, and its crossbars guide the adjacent rollers so as to maintain their axes generally parallel to the axis of the shaft on which the bearing is mounted.

In this invention, the roller adjacent a crossbar is guided by the crossbar and normally makes substantially line contact with the crossbar for substantially the entire length of the roller. In turn, this roller guides the next adjacent roller.

The opposed surfaces of the crossbars are inclined or curved throughout their thickness and converge to form roller retaining portions, opposite the raceway, the roller retaining portions being circumferentially spaced apart less than the sum of the diameters of the rollers to be housed in the window, so as to retain the rollers in the cage in conjunction with the race.

To assemble the cage, the outer race and the rollers together, the cage is inserted within the flanges of the outer race and the cage rims aligned therewith. Considering the first pair of rollers to be inserted into the cage, the first roller is easily placed in a window, the roller resting upon the raceway. The second roller is then placed in the space defined by the surface of the first roller and the edge of the adjacent crossbar. A force is applied to the second roller which is transmitted on one side to the first roller and its closest crossbar and on the other side to one of the roller retaining crossbar portions.

The force on the first roller tends to move the first roller circumferentially against its complementary crossbar biasing this crossbar generally radially inwardly, whereas the force from the second roller on the roller retaining crossbar portion tends to bias the latter generally radially outwardly and in the opposite circumferential direction. But the inward force component on the crossbar complementary to the first roller is greater than the outward force component on the edge of the roller retaining crossbar portion for the second roller. The result is that the cage is initially moved through its small clearance with the race flanges and seats on the part of the flanges generally opposite to the window where the roller is sought to be inserted. Thereafter, since the bars are rigid enough that finger pressure is not enough to circumferentially spread the bars sufficiently to enable the second roller to be inserted, but the cage rims are resilient, arcuate portions of the cage rims elastically deform radially inwardly carrying with them the crossbars between which it is desired to insert the roller, until the distance between the first roller and the crossbar roller retaining portion for the second roller is sufficient to permit the second roller to pass, at which time the second roller snaps into place and the cage springs back to its initial shape.

The foregoing and other objects of the invention, and the best mode in which I have contemplated applying such principles will more fully appear from the following description and accompanying drawings in illustration thereof.

In the drawings,

FIG. 1 is a perspective view of an assembled roller bearing incorporating this invention;

FIG. 3 is an enlarged, cross-sectional view of the bearing illustrated in FIG. 1, but partially showing a shaft for the bearing;

FIG. 4 is a partial sectional view, taken along the line 4—4 in FIG. 3, showing the rollers inserted in the window but drawn at a larger scale than FIG. 3;

FIG. 4a is a view similar to FIG. 4, showing a modification in which the guiding and retaining portions are arcuate;

Figure 2:
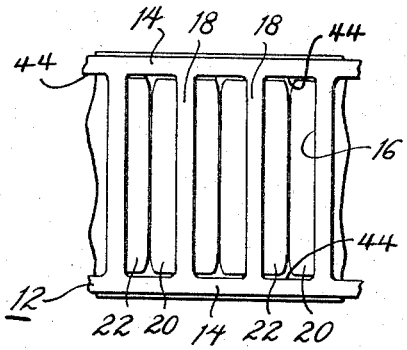
FIG. 2 is a plan view of a portion of the cage shown in FIG. 1, but at a larger scale than FIG. 1 and looking at the inner surface of the cage.

Referring to the drawings, the cylindrical needle roller bearing 10 comprises a jointless tubular cage 12 having cylindrical end rims 14 and a plurality of axially parallel windows 16 (FIGS. 2 and 4) separated by crossbars 18. Each window 16 is adapted to receive and guide two rollers, designated for convenience as 20 and 22. The cage 12, and particularly the rims 14, are of thin cross-section, having a thickness no greater than one-third the diameter of the rollers 20 and 22.

The cage 12 is received within an outer race ring 24 provided with axially spaced, symmetrical and integral radial flanges 26 which have annular and coaxial cylindrical surfaces 30. Further, the flanges 26 form opposed, symmetrical and radial faces 32 which together with a cylindrical surface 34 define a raceway 36 for the rollers 20 and 22. To facilitate the grinding of the cylindrical surface 34 the latter may be annularly undercut, as shown at 40, along its opposed margins.

As partially shown in FIG. 3, the roller bearing 10 may be placed about a shaft 42 which is generally hardened and ground.

The cage 12 is placed within the race ring 24 so that the cylindrical surfaces 54 of the cage rims 14 overlie and make a slip fit with the cylindrical flange surfaces 30. The race flanges 26 provide the only support for the cage 12, but a running radial clearance is provided between the cage rims 14 and the race flanges 26. This radial clearance is small enough so that no substantial radial movement of the cage 12 relative to the race 24 takes place and this clearance is designated as A in the drawings.

Preferably the cage 12 and race 24 are made from steel as are the rollers.

Figure 5:
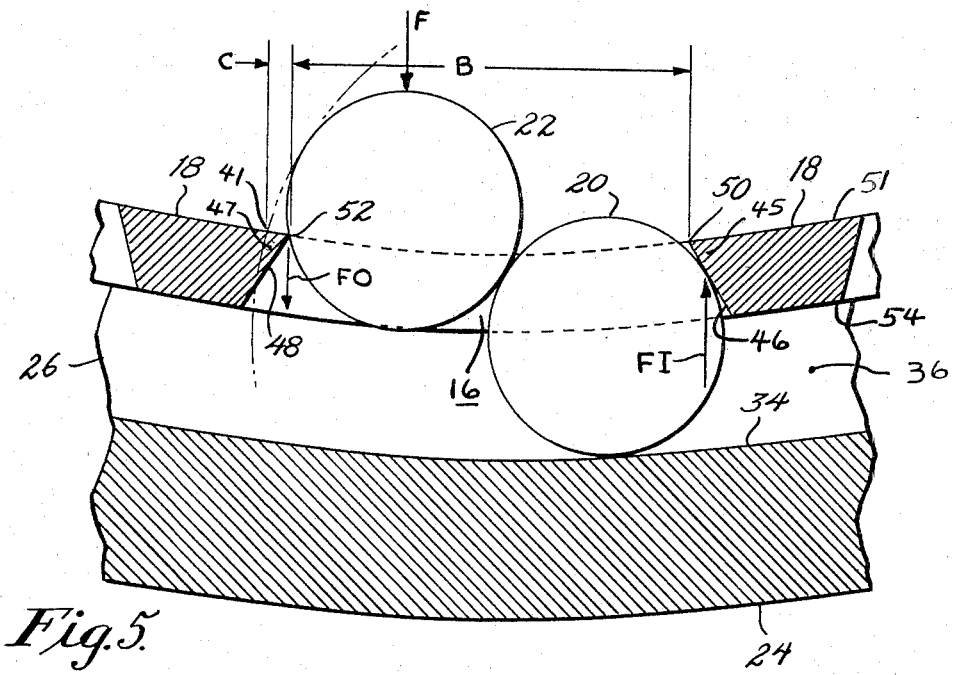
FIG. 5 is a further enlarged, partial sectional view, similar to FIG. 4, but showing the rollers, cage and race when the second roller to be inserted in a window is first placed over the space into which it is to enter.

The crossbars 18 form opposed, elongated side walls 46 and 48 which are substantially flat and inclined relative to radial lines so as to converge radially inwardly to a distance, designated B in FIG. 4, which is less than twice the diameter of a roller, as shown, by twice the amount of the interference, designated C in FIG. 5 to provide roller retaining portions 45 and 47 at the part of the window farthest from the raceway. The part of the window closest to the raceway has a circumferential width greater than twice the diameter of a roller, as shown. Thus, it is seen that the narrowest circumferential width of each window extends between the junctures or edges 50 and 52 formed by the side walls 46 and 48 and the cylindrical surface 51.

The interference C is determined by assuming the roller 20 to be abutted against the complementary side wall 46, while the cage and the race are concentric, and swinging an arc about the center of the roller 20, the arc having a radius equal to one and one-half times the diameter of a roller, and determining the point at which this arc intersects the inner cylindrical surface 51 of the cage 12 at 41. Preferably, this interference, dimension C, is made about one-tenth the diameter of a roller. The side walls 46 and 48 converge symmetrically about a radial line through the center of the window, as the angle therewith of the side wall 48, but if desired the inclination of the walls 46 and 48 could be unsymmetrical so long as they converge to form roller retaining portions. While the walls 46 and 48 have been shown as substantially flat, they may be curved also as shown at 46' and 48' in FIG. 4a.

Also, the interference, dimension C may vary from about one-eighth to one-fifteenth of the roller diameter, depending on the diameter of the roller and the diameter of the pitch circle of the annular array of rollers.

As illustrated, the side walls 46 and 48 extend completely from the outer cylindrical surface 54 of the cage to its cylindrical surface 51. Further, each window 16 is defined by opposed, substantially radially extending, end walls 44 (FIGS. 2 and 3) formed by the rims 14. Thus, when the bearing is assembled, the roller retaining portions 45 and 47 of the opposed side walls 46 and 48, together with the surface 34 of the raceway 36, restrict the free passage of the rollers 20 and 22 out of the windows 16.

In addition to retaining the rollers from moving freely radially inwardly, the side walls 46 and 48 also guide the rollers. That is, one or the other of side walls 46 and 48 will contact, along substantially the entire length of the roller, the adjacent roller, and in FIG. 4 each window illustrates a side wall 48 in contact with a roller 22 (along substantially the entire length of a roller 22) and each roller 22 in contact with a roller 20, the rollers 20 being slightly spaced from the side walls 46.

Also, the entire cage 12 is disposed radially inwardly of the pitch circle, though it need not be, and more than one-half of the height of each roller is disposed between the outer cylindrical surface portions of the crossbars and the raceway surface 34. Similarly, the rollers project beyond the inner cylindrical surface portions of the crossbars but to a smaller extent, as shown.

It is a feature of this invention to control the resilience of the rims 14 relative to the resilience of the crossbar 18 so that when generally radial forces are applied to the crossbars 18 the rims will elastically deform before the crossbars deform or twist. That is, the crossbars 18 have substantially the same cross-sectional shape throughout their lengths, from rim to rim, unlike the crossbars shown, for instance, in Barr et al. Pat. No. 2,765,203 in which projecting lips 7 are provided to retain the rollers against freely moving radially inwardly and the lips are substantially spaced relative to the ends of the windows so as to allow adequate lateral springing of the crossbars when the rollers are inserted into the windows, see column 4, lines 4 to 8 thereof.

Further, the roller retaining portions 45 and 47 in this invention are formed throughout the lengths of the crossbars 18 and would prevent full endwise insertion of the rollers and springing of the crossbars, for instance, as shown in Barr et al. Pat. No. 2,765,202. Also, the roller retaining portions 45 and 47 in this invention are formed within the planes bounded by the crossbar cylindrical surfaces extending from rim to rim, unlike the inclined crossbars which have radially inwardly (relative to the rims) and centrally disposed projecting lips 7, shown in the last mentioned Barr et al. patent. That is, the crossbars in Barr et al. Pat. No. 2,765,202 are elastically deformable radially inwardly for insertion of the rollers, see column 4, lines 32 to 38 thereof.

Figure 7:
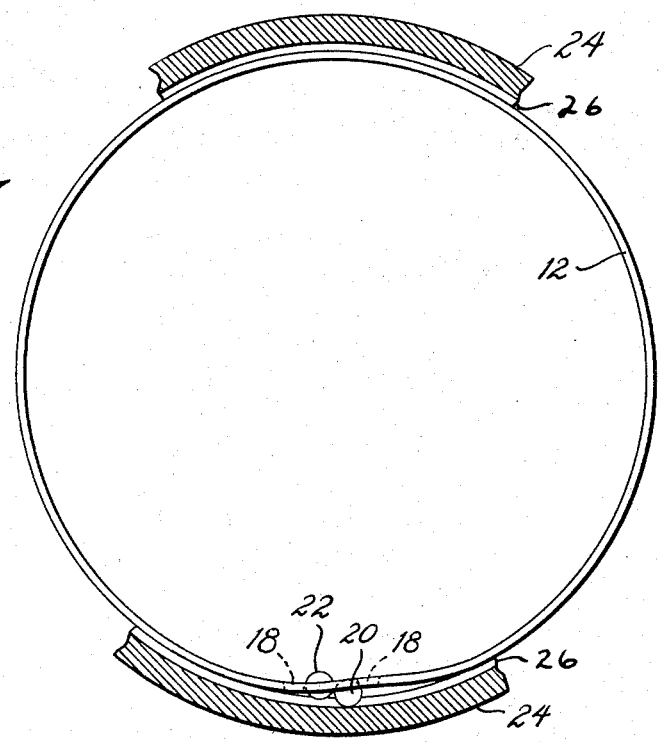
FIG. 7 is a side elevation of the cage, showing portions of the race ring in vertical section, and diagrammatically illustrating the elastic deformation of the cage just before the second roller snaps into the window.

In this invention, to assemble the bearing, the cage 12 is inserted within the race 24 so that the cage rims 14 overlie the race flanges 26, as shown in FIGS. 3 and 5, and are axially aligned therewith. Referring to FIGS. 5 and 7 the first roller, roller 20, is then easily inserted into a window, for instance, the lowermost window. The second roller, roller 22, is then placed over the space in the window which it is intended that it shall occupy and the roller 22 initially comes to rest against the edge 52 and the adjacent surface portion of the roller 20, as shown in FIG. 5. Thereafter a force is applied to the roller 22, generally downwardly as viewed in FIG. 5, for the purpose of inserting the roller 22 into the window next to the roller 20.

Assuming that the pair of rollers shown in FIG. 5 are the first pair to be inserted into the cage, the pair shown in FIG. 7, upon the application of the force F to the roller 22, in a direction generally parallel to a radial line through the center of the window, the roller 22 will urge the roller 20 into contact with the side wall 46, as the roller 22 presses upon the edge 52 and the adjacent surface portion of the roller 20.

The application of the force F, merely finger pressure, on the roller 22 results in two force components being placed on the cage 12, a force FO acting generally radially outwardly on the edge 52 and a larger force FI acting generally radially inwardly on the inclined crossbar surface 46. The forces FO and FI are insufficient to deform or twist the crossbars, but the inward force FI on the surface 46 is sufficiently greater than the outward force FO and momentarily lifts the cage upward (as viewed in FIGS. 5, 6 and 7) so that the upper part of the cage rims contact the upper parts of the flanges and then the rims deform in a small zone of the cage, diagrammatically shown in FIG. 7 wherein the deformation has been exaggerated for clarity. It is to be noted that the rims do not deform symmetrically, but rather have a larger inward deformation at the zone of the righthand crossbar, as viewed in FIGS. 6 and 7, than at the zone of the lefthand crossbar.

The mentioned rim deformation moves inwardly both the lefthand and righthand crossbars because the roller 20 urges the surface 46 inwardly to a new position, under pressure from the roller 22, and when sufficient inward movement of the crossbars takes place, the distance between the edge 52 and the adjacent surface portion of the roller 20 becomes great enough to permit the roller 22 to pass by the edge 52, into the window, at which time the roller 22 snaps against the raceway surface 34 and the cage springs back to its original cylindrical shape.

Figure 6:
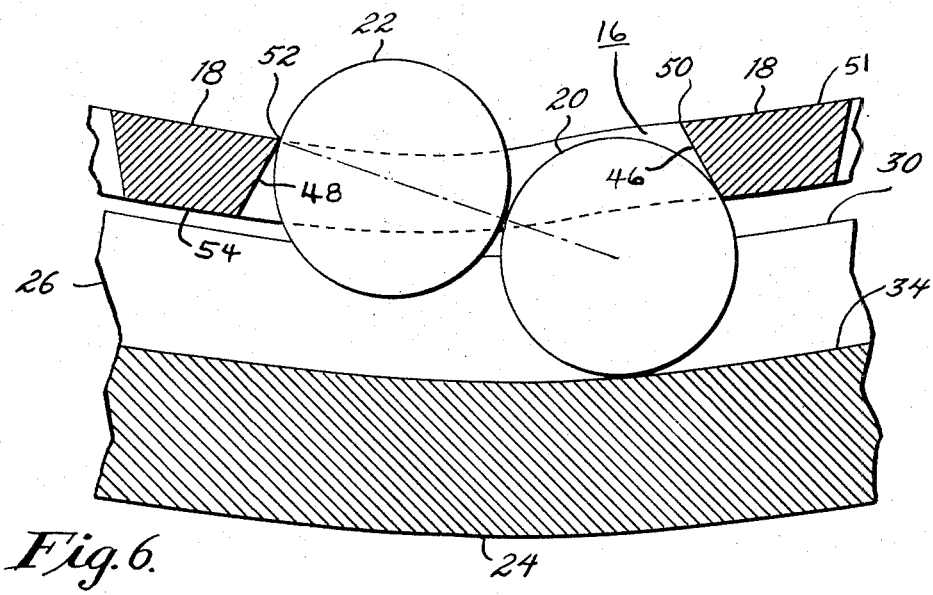
FIG. 6 is a partial sectional view, similar to FIG. 5, but showing the momentary position just before the second roller snaps into the window.

As noted, when the force is applied to the roller 22 of the first pair, with the cage and race positioned as shown in FIGS. 5, 6 and 7, the cage 12 will first be moved upwardly until it contacts the upper portion of the race flanges at which time all of the clearance is between the lowermost portions of the rims and the corresponding parts of the flanges. Such upward movement of the cage will take place even after most of the rollers have been inserted into the cage, because the clearance between the rollers and the surfaces 46 and 48 is large enough so that the cage will move upwardly into contact with the flanges when the force is initially applied to the second roller to be inserted in a window, i.e., the cage rides on the flanges at all times during operation.

Figure 8:
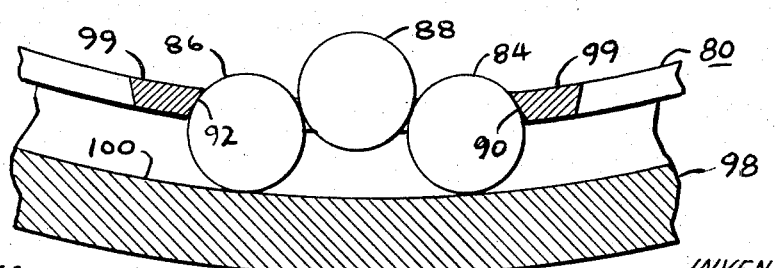
FIG. 8 illustrates a modification of this invention in which each window receives three rollers.

FIG. 8 illustrates a modification of this invention in which a cage 80 has crossbars 99 separating windows 82 each of which receives three rollers 84, 86 and 88. Each crossbar 99 forms inclined side walls 90 and 92 and roller retaining portions 94 and 96 extending from rim to rim of the cage, similarly to the embodiment previously described.

In the embodiment of FIG. 8, after the cage 80 is placed within the outer race 98, two end rollers 84 and 86 are first placed in a window and the third roller to be inserted in the window is the center roller 88. When the center roller 88, placed as shown in FIG. 8, is pressed generally radially outwardly, generally radially inwardly force components are placed on both symmetrically inclined side walls 90 and 92 by the rollers 84 and 86, deforming the cage rims inwardly until the crossbars 99 are moved radially inwardly and the end rollers 84 and 86 are moved apart sufficiently to a distance wherein the roller 88 snaps against the race surface 100 and the cage 80 springs back to its cylindrical shape, the center roller thereafter being keystoned between the two end rollers and retained within the cage thereby.

Having described this invention, what I claim is:

1. A tandem cage-type needle roller bearing having a race ring provided with a raceway and integral symmetrical flanges on both ends of the raceway, the flanges having circumferential surfaces in the axial direction, needle rollers in contact with the raceway between the flanges, the rollers being arranged in tandem groups side by side in which the rollers of each tandem group are mutually in contact, and a jointless tubular metallic cage extending circumferentially of the bearing, having a radial thickness not in excess of one-third of the diameter of the rollers and elastic for insertion of rollers, the cage riding the circumferential surfaces of the flanges, the cage having windows in which the tandem groups of rollers are retained, the windows being spaced circumferentially by cage crossbars, and the crossbars at the axial ends being connected by cage rims adjoining the circumferential surfaces of the flanges, the crossbars having guiding and retaining surfaces which engage rollers of each tandem group, the guiding and retaining surfaces forming interference (C) retaining the rollers in each window, the extent of interference at each circumferential side of each crossbar being between one-eighth and one-fifteenth of the roller diameter, the cage, supported by engagement of the rims on the flanges, when the last roller of a tandem group is forced toward the adjoining raceway against an adjoining crossbar, being elastically deflectable at the cage rims to move away from the adjoining flanges and aided by the clearance to admit said last roller into the window notwithstanding the interference and hold the rollers of the tandem group in the window by the interference at each circumferential side.

2. A bearing of claim 1, having two rollers side by side in each tandem group within each window.

3. A bearing of claim 1, in which the guiding and retaining surfaces of the crossbars converge in the general radial direction away from the adjoining raceway to form the interference.

4. A bearing of claim 3, in which the converging guiding and retaining surfaces are straight.

5. A bearing of claim 3, in which the converging guiding and retaining surfaces are arcuate.

6. A bearing of claim 1, in which the rollers at the circumferential sides of each tandem group make substantially line contact with the crossbar for substantially the entire length of the crossbar.

7. A bearing of claim 1, in which the interference (C) is substantially one-tenth of the roller diameter.

8. A cylindrical needle roller bearing comprising an outer race ring having symmetrical integral flanges at both ends with a raceway therebetween, a jointless tubular metallic cage having end rims riding against said flanges, having roller-retaining crossbars connecting both end rims and having windows between the crossbars to accommodate two rollers each side by side, characterized in that the cage rims are sufficiently resilient to permit the assembly of two rollers into each window of the completely finished and mounted cage by flexing inwardly along a segment at both sides of a particular window by laying in a first roller and exerting slight outward pressure on the second roller toward the space which it is to occupy in the window, against an adjoining crossbar and also against the first roller, while the cage is supported by the rims against the flanges, the first roller being forced against the crossbar which it contacts and lifting that crossbar, together with the rims, away from the raceway, thus creating space for the first roller to move further away from the opposite crossbar, permitting the second roller to snap past the edge of this adjoining crossbar and thus avoid the otherwise unsurmountable substantial interference (C), without causing permanent deformation or twisting of the retaining crossbars.

9. A bearing of claim 8, in which each of the crossbars has guiding surfaces which converge away from the adjoining raceway, whereby when said second roller is pressed into the window, said first roller lifts this adjoining crossbar and the rims of the raceway by inclined plane action.

10. A method of assembling a cage needle roller bearing, having an annular race provided with a raceway and integral symmetrical flanges having circumferential surfaces at each end, and having rollers to be inserted in tandem groups side by side within windows of the jointless tubular cage provided with crossbars between the windows and rims connecting the ends of the crossbars, which method comprises forming a tubular metallic cage with a thickness less than one-third the roller diameter and with rims of thin cross-section and of resilient material, assembling the completely formed cage with the rims running against the circumferential surfaces of each flange, there being retaining and guiding surfaces on both sides of each crossbar which form an interference (C) when the tandem group of rollers is in place in the window which is between one-eighth and one-fifteenth the roller diameter, inserting in a window all but the last roller of the tandem group, positioning the last roller of the tandem group generally in line with the position it is to occupy and against the group, and applying force to the last roller toward the adjoining raceway against its adjoining crossbar, and thereby by another roller moving a crossbar and with it both rims away from the raceway and the flanges to allow room with aid of the clearance for insertion of the last roller against the raceway notwithstanding the interference and permit the cage to snap back to a position in which the tandem group of rollers is retained in the window by the interference.

11. A method of claim 10, in which two rollers side by side form each tandem group, which further comprises resting one side of the last roller against the edge of a crossbar prior to insertion of the last roller in the window.

12. A method of claim 10, in which the sides of the crossbars converge away from the adjoining raceway, and there are two rollers side by side in each tandem group, which further comprises urging a crossbar and both rims away from the raceway and away from the flanges by inclined plane action exerted through the roller first placed in the window by force imparted by the roller last inserted in the window as it snaps past the interference (C).

References Cited

UNITED STATES PATENTS 2,729,520  1/1956  Richie et al. _____ 308—213

FOREIGN PATENTS 538,471  7/1954  Italy.
322,003  6/1953  Switzerland.

MARTIN P. SCHWADRON, *Primary Examiner.*

FRANK SUSKO, *Examiner.*